United States Patent
Worm et al.

(10) Patent No.: US 6,294,627 B1
(45) Date of Patent: Sep. 25, 2001

(54) LOW TEMPERATURE FLUOROCARBON ELASTOMERS

(75) Inventors: Allan T. Worm, North St. Paul, MN (US); Nikolai Vladimirovich Veretennikov, Saint-Petersburg (RU); Margarita Alekseevna Volkova, Saint-Peterburg (RU); Sergey Vasilievich Sokolov, Saint Petersburg (RU)

(73) Assignee: Dyneon LLC, Oakdale, MN (US)

( * ) Notice: Subject to any disclaimer, the term of this patent is extended or adjusted under 35 U.S.C. 154(b) by 0 days.

(21) Appl. No.: 09/313,438

(22) Filed: May 18, 1999

Related U.S. Application Data

(60) Provisional application No. 60/098,461, filed on Aug. 31, 1998.

(51) Int. Cl.$^7$ ................................................. C08F 116/12
(52) U.S. Cl. ........................................................ 526/247
(58) Field of Search ............................................ 526/247

(56) References Cited

U.S. PATENT DOCUMENTS

| | | | |
|---|---|---|---|
| 3,450,684 | * 6/1969 | Darby ........................ | 526/247 |
| 3,470,176 | 9/1969 | Zollinger ...................... | 260/248 |
| 3,523,118 | 8/1970 | Emerson et al. .............. | 260/248 |
| 3,546,186 | 12/1970 | Gladding et al. ............. | 260/80.73 |
| 3,632,788 | 1/1972 | Stivers et al. ................ | 260/30.8 |
| 3,817,960 | 6/1974 | Resnick ....................... | 260/87.5 |
| 4,005,142 | 1/1977 | Evers .......................... | 260/571 |
| 4,418,186 | 11/1983 | Yamabe et al. .............. | 526/247 |
| 4,434,106 | 2/1984 | Rosser et al. ................ | 260/465.5 |
| 4,525,539 | 6/1985 | Feiring ........................ | 525/326.3 |
| 4,529,784 | * 7/1985 | Finlay ......................... | 526/247 |
| 4,912,171 | 3/1990 | Grootaert et al. ............ | 525/340 |
| 5,214,106 | 5/1993 | Carlson et al. ............... | 525/263 |
| 5,225,504 | 7/1993 | Tatsu et al. .................. | 526/206 |
| 5,268,405 | 12/1993 | Ojakaar et al. ............... | 524/366 |
| 5,679,851 | 10/1997 | Saito et al. .................. | 564/136 |
| 5,696,216 | 12/1997 | Krüger et al. ................ | 526/247 |
| 5,717,037 | 2/1998 | Saito et al. .................. | 525/326.4 |
| 5,736,614 | 4/1998 | Saito et al. .................. | 525/326.4 |

FOREIGN PATENT DOCUMENTS 0 290 848 A1   11/1988   (EP) .

OTHER PUBLICATIONS

W. M. Grootaert et al., "Fluorocarbon Elastomers", Kirk–Othmer, Encyclopedia of Chemical Technology, vol. 8, pp. 900–1005 (4$^{th}$ ed., John Wiley & Sons, 1993) no month.

"The Role of the Reactor Surface in the Liquid–Phase Oxidation of Hexafluoropropylene", S.V. Kartsov, P.I. Valov, L.F. Sokolov, and S.V. Sokolov, Institute of Chemical Physics, Academy of Sciences of the USSR , Moscow, translated from Izvestiya Akademii Nauk SSSR, Seriya Khimicheskaya, No. 10, pp. 2268–2272, Oct., 1978.

"Synthesis of Fluoroorganic Compounds", Monomers and Intermediate Products, Academician I.L. Knunyanc and Prof. G.G. Yakobson, Moscow, Izdatelstuo, "Chimia" 1977. no month.

\* cited by examiner

*Primary Examiner*—Bernard Lipman
(74) *Attorney, Agent, or Firm*—James V. Lilly

(57) ABSTRACT

A fluorocarbon polymer which includes: repeating units derived from one or more perfluorinated ethers of the formula $CF_2=CFO-(CF_2)_m-(O(CF_2)_p)_n-OR_f^1$ wherein $R_f^1$ is a perfluorinated ($C_1-C_4$)alkyl group, m=1–4, n=0–6, and p=1–2; and repeating units derived from vinylidene fluoride; wherein the polymer has a glass transition temperature of –50° C. or lower and an oxygen to carbon ratio of at least about 0.2.

30 Claims, No Drawings

LOW TEMPERATURE FLUOROCARBON ELASTOMERS

This application claims priority from U.S. Ser. No. 60/098,461, filed Aug. 31, 1998.

FIELD OF THE INVENTION

This invention relates to the preparation of fluorocarbon polymeric and cured elastomeric materials containing perfluoroether units, particularly repeating units derived from perfluoroalkylvinyl ether compounds.

BACKGROUND OF THE INVENTION

Fluorocarbon elastomers are synthetic elastomeric polymers with a high fluorine content. See, for example, W. M. Grootaert et al., "Fluorocarbon Elastomers", Kirk-Othmer, Encyclopedia of Chemical Technology, Vol 8, pp. 900–1005 (4th ed., John Wiley & Sons, 1993). Fluorocarbon elastomers, particularly the copolymers of vinylidene fluoride (VF2) with other ethylenically unsaturated halogenated monomers, such as $C_3F_6$ (hexafluoropropylene or HFP), have become the polymers of choice for high temperature applications, such as seals, gaskets, and linings, especially when shaped articles thereof are subject to exposure to aggressive or harsh environments, such as solvents, lubricants, and oxidizing or reducing conditions. See, for example, U.S. Pat. No. 4,912,171 (Grootaert et al.), which discloses a fluoroelastomeric polymer prepared from VF2, tetrafluoroethylene (TFE), and a copolymerizable hydrocarbon olefin.

A major drawback to many applications of shaped articles made of such fluorocarbon elastomers has been their inability to satisfactorily function at low temperatures. Typically, at temperatures only slightly below 0° C., shaped articles made from copolymers of VF2 and HFP become stiff and fail to perform satisfactorily.

Low temperature flexibility of VF2 elastomers may be improved by substituting perfluoro(allyl vinyl ethers) for the HFP in VF2/HFP/TFE copolymers as discussed in U.S. Pat. No. 5,214,106 (Carlson et al.). Polymers of perfluorovinyl ethers or copolymers with LTE are also discussed in U.S. Pat. No. 3,817,960 (Resnick).

Cured perfluoroelastomers may be provided that exhibit enhanced low temperature properties through the incorporation by conventional compounding techniques of a selected perfluoropolyether into the perfluoroelastomer compound as discussed in U.S. Pat. No. 5,268,405 (Ojakaar et al.). A higher than normal loading of such additives may be accomplished by using a compatibility extender such as discussed in U.S. Pat. No. 3,632,788 (Stivers et al.). These additives are not permanently incorporated into the polymers and can be lost during post treatment and use of the shaped articles.

Many other fluorinated ethers have been described in the literature. One type is characterized by one of several homopolymeric segments or blocks of repeating units of the formula $—CF(CF_3)CF_2—O—$ made from hexafluoropropylene oxide. Another type is that characterized by blocks of repeating units of the formula $—CF_2CF_2—O—$ made from tetrafluoroethylene oxide. Others, made by reacting oxygen with tetrafluoroethylene or hexafluoropropylene, are characterized by a backbone of repeating $—CF_2O—$, $—CF(CF_3)CF_2O—$, or $—CF(CF_3)O—$ units, a backbone of randomly distributed $—CF_2O—$ and $—CF_2CF_2O—$ units, a backbone of $—CF(CF_3)CF_2O—$ and $—CF_2CF_2O—$units and optionally a, $—CF_2O—$ and $—CF(CF_3)O—$ units. Another type of fluorinated ether is that characterized by backbone units of the formula $—(CF_2)_aO(CF_2)_b—$ made by photopolymerization.

A peroxide-vulcanizable, fluorine-containing elastomer can be attained by copolymerizing a perfluoro(vinylether) compound represented by the general formula: $CF_2=CFO(CF_2CF(CF_3)O)_m(CF_2)_nX$, wherein X is a bromine atom or an iodine atom and m and n each are 1, 2 or 3; and a fluorine-containing olefin having 2 to 8 carbon atoms in the presence of an iodine and bromine-containing compound represented by the general formula: $RBr_nI_m$, wherein R is a fluorohydrocarbon group, a chlorofluorohydrocawbon group, a chlorohydrocarbon group or a hydrocarbon group, and n and m each are 1 or 2 as disclosed in U.S. Pat. No. 5,225,504 (Tatsu et al.).

None of these materials, however, have sufficient low temperature flexibility, particularly flexibility at temperatures as low as –50° C. or lower.

SUMMARY OF THE INVENTION

The present invention provides a fluorocarbon polymer which includes: repeating units derived from one or more perfluorinated ethers of the formula $CF_2=CFO—(CF_2)_m—(O(CF_2)_p)_n—OR_f^1$ wherein $R_f^1$ is a perfluorinated ($C_1$–$C_4$) alkyl group, m=1–4, n=0–6, and p=1–2; and repeating units derived from vinylidene fluoride; wherein the polymer has a glass transition temperature of –50° C. or lower and an oxygen to carbon ratio of at least about 0.2. Preferably, when m is 2 or 3 in the above formula, n is not 0.

The fluorocarbon polymer preferably further includes an effective amount (preferably, 0.2–5 mole-%) of cure site moieties derived from one or more compounds of the formulae: a) $CX_2=CX(Z)$, wherein (i) X is H or F; and (ii) Z is Br, I, or $R_f^2U$ wherein U=Br, I, or CN and $R_f^2$=a perfluorinated divalent linking group optionally containing O atoms; and (b) $Y(CF_2)_qY$, wherein: (i) Y is Br or I; and (ii) q=1–6.

The present invention also provides an elastomeric polymer prepared from a crosslinkable composition comprising a fluorocarbon polymer as described above. The crosslinkable composition can further include a free radical initiator, such as a peroxide initiator, a co-curing agent, such as a triallyl isocyanurate, and/or one or more fillers. The elastomeric polymer can be used to make seals, hoses, diaphragms, coatings, etc.

The present invention further provides methods of preparing an elastomeric polymer as described above. A preferred method includes: (a) providing a crosslinkable composition comprising a fluorocarbon polymer, the polymer comprising: i) repeating units derived from one or more perfluorinated ethers of the formula (Formula I): $CF_2=CFO—(CF_2)_m—(O(CF_2)_p)_n—OR_f^1$ wherein $R_f^1$ is a perfluorinated ($C_1$–$C_4$)alkyl group, m=1–4, n=0–6, and p=1–2; ii) repeating units derived from vinylidene fluoride; and iii) 0.2–5 mole-% of cure site moieties derived from one or more compounds of the formulae: $CX_2=CX(Z)$, wherein: X is H or F; and Z is Br, I, or $R_f^2U$ wherein U=Br, I, or CN and $R_f^2$=a perfluorinated divalent linking group optionally containing O atoms; and $Y(CF_2)_qY$, wherein: Y is Br or I; and q=1–6; wherein the polymer has a glass transition temperature of –50° C. or lower and an oxygen to carbon ratio of at least about 0.2; and (b) subjecting the crosslinkable composition to conditions effective to at least partially cure it. Preferably, the step of subjecting the crosslinkable composition to conditions effective to at least partially cure it includes applying heat and pressure and/or subjecting the composition to radiation.

DETAILED DESCRIPTION OF THE INVENTION

The present invention relates to the preparation of fluorocarbon polymers, particularly curable fluorocarbon polymers having cure site, cured elastomers, and the processes for their curing. These materials have a variety of uses. The fluorocarbon polymers can be cured to provide fluorocarbon elastomers for use in seals, gaskets, hoses, diaphragms, linings, and other shaped articles, that have improved performance characteristics, particularly flexibility, at low temperatures. They can also be used as coatings. Even if not cured, these materials can be used in caulk or as diluents in thermoplastics, for example, to provide enhanced low temperature properties.

Preferably, the fluorocarbon polymers are prepared from perfluoroalkylvinyl ether and vinylidene fluoride, and have a Tg of less than about −50° C., and more preferably, less than about −60° C. Herein, particularly in the claims, Tg is defined as the midpoint on the curve obtained from a differential scanning calorimeter (DSC) analysis of the polymer using ASTM E1356-91 (Reapproved 1995). For certain of the examples in the Examples Section, the Tg values are slightly lower than would be obtained if this method were used. These values were obtained using Russion Standard Method 12254-66, which defines Tg as the start of deformation on defrosting a sample under a 5 kg load. Such values are typically 5–10° C. lower than if the ASTM method were used.

The present invention provides a fluorocarbon polymer (preferably, a curable fluorocarbon elastomer) that includes repeating units (i.e., interpolymerized units) derived from vinylidene fluoride and a perfluoenaten ether of the formula (Formula I):

$$CF_2=CFO-(CF_2)_m-(O(CF_2)_p)_n-OR_f^1$$

wherein $R_f^1$ is a perfluorinated ($C_1$-$C_4$)alkyl group, m=1–4 (preferably m=2–4, and more preferably 2 for certain embodiments, and 1–2 for other embodiments) and n=0–6 (preferably 1–5, and more preferably 2–4) and p=1–2 (preferably, 1). For certain aspects of the invention, if m>2, then n is preferably at least 1. These perfluorinated ethers are also referred to herein as perfluoroalkoxyalkylvinylethers ("PAAVE"). Reference is made to The Role of the Reactor Surface in the Liquid-Phase Oxidation of Hexafluoropropylene, S. V. Kartsov, P. I. Valov, L. F. Sokolov, and S. V. Sokolov, Institute of Chemical Physics, Academy of Sciences of the USSR, Moscow, translated from Izvestiya Akademii Nauk SSSR, Seriya Khimicheskaya, No. 10, pp. 2268–2272, October, 1978, as well as U.S. Pat. No. 3,817,960 (Resnick) and U.S. Pat. No. 5,696,216 (Kruger et al.) in relation to the production of the compounds of Formula I.

The perfluorinated ether of Formula I has no pendant alkyl groups (e.g., $-CF(CF_3)-CF_2-O-$) which can reduce the low temperature flexibility of the cured material. The fluorocarbon polymer also has an oxygen to carbon ratio of at least about 0.2, which has been discovered to play a significant role in the low temperature properties of the final cured elastomeric material.

The oxygen to carbon ratio (O/C) is determined by dividing the total moles of oxygen in the polymer by the total moles of carbon atoms in the polymer. The higher the oxygen to carbon ratio, the more desirable the low temperature characteristics of the cured elastomer. Specifically, the higher the O/C ratio, the lower the glass transition temperature ($T_g$), which results in a lower temperature at which the polymer is still elastic, and a lower temperature at which the cured elastomer is still flexible. However, the effect of varying the O/C ratio is qualitative and not quantitative because the $T_g$ may be affected by a number of other factors. Such factors include overall molecular weight, and the presence of optional comonomers, such as TFE, and the length of the unit blocks of the comonomers.

There are at least two ways to alter the O/C ratio, which can be used in combination. One way in which the O/C ratio can be increased is to increase the length of any pendant groups, which are typically oxygen-containing alkyl groups, of the polymer by adding perfluoroalkoxy fragments high in oxygen atoms. Another way is to increase the mole percent of the perfluoroalkoxyallylvinylethers that are high in oxygen atoms in the total composition. The most effective way of increasing the O/C ratio, however, is to increase the quantity of perfluoromethylvinyl ether ($-CF_2O-$) or perfluoroethylvinyl ether ($-CF_2CF_2O-$)segments in the vinyl ether. The use of perfluoropropylvinyl ethers are less effective in increasing the O/C ratio.

Examples of suitable fluorocarbon polymers of Formula I are listed in the following Table 1 along with the $T_g$ and O/C ratio (m+n=1).

TABLE 1

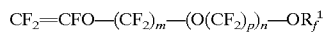

| Example # | R Group | m | $T_g^1$ degrees C | O/C Ratio[2] |
|---|---|---|---|---|
| 1 | $-OCF_2CF_2OCF_2OCF_3$ | 0.3 | −70 | 0.25 |
| 2 | $-OCF_2CF_2-(OCF_2)_4-OCF_3$ | 0.3 | −95 | 0.40 |
| 3 | $-OCF_2CF_2(OCF_2CF_2)_4OCF_3$ | 0.2 | −70 | 0.29 |
| 4 | $-OCF_2CF_2(OCF_2CF_2)_4OCF_3$ | 0.3 | −75 | 0.34 |
| 5 | $-OCF_2CF_2(OCF_2CF_2)_4OCF_3$ | 0.4 | −80 | 0.37 |
| 6 | $-OCF_2CF_2-(OCF_2)_2-OCF_3$ | 0.2 | −75 | 0.27 |
| 7 | $-OCF_2CF_2-(OCF_2)_2-OCF_3$ | 0.3 | −79 | 0.34 |
| 8 | $-OCF_2CF_2-(OCF_2)_2-OCF_3$ | 0.4 | −86 | 0.40 |
| 9 | $-OCF_2CF_2-(OCF_2)_4-OCF_3$ | 0.2 | −91 | 0.35 |
| 10 | $-OCF_2CF_2-(OCF_2)_4-OCF_3$ | 0.3 | −100 | 0.44 |
| 11 | $-OCF_2CF_2-(OCF_2)_4-OCF_3$ | 0.4 | −109 | 0.50 |
| 12 | $-OCF_2CF_2-(OCF_2)_6-OCF_3$ | 0.2 | −90 | 0.42 |
| 13 | $-OCF_2CF_2-(OCF_2)_6-OCF_3$ | 0.3 | −107 | 0.51 |
| 14 | $-OCF_2CF_2-(OCF_2)_6-OCF_3$ | 0.4 | −119 | 0.66 |

[1]Determined using Russian Standard Method 12254-66 (accuracy 3° C.)
[2]O/C ratio = [Number of O atoms × fraction of $CF_2=CF-R$]/[(Number of C atoms in VF2 × fraction of VF2) + (Number of C atoms in $CF_2=CF-R$ × fraction of $CF_2=CF-R$)]

The fluorocarbon polymers of the present invention without curing are useful in a variety of applications. However, they are particularly advantageous because they can be cured to form elastomers having significant low temperature properties (e.g., flexibility). They can be cured by a variety of techniques. Preferably, however, the polymers include a halogen (typically, bromine and iodine) cure site or a nitrile cure site within the molecule.

Thus, preferably, and advantageously, the fluorocarbon polymer includes repeating units derived from a perfluorinated ether of the formula $CF_2=CFO-(CF_2)_m-(O(CF_2)_p)_n-OR_f^1$ wherein $R_f^1$ is a perfluorinated ($C_1$-$C_4$)alkyl group, m=1–4, n=0–6, and p=1–2, repeating units derived from vinylidene fluoride, and an effective amount (i.e., an amount effective to provide a cured elastomer) of cure site moieties derived from one or more compounds containing a halogen or a nitrile moiety. Cure site moieties used in the invention may have pendant groups, such as alkyl moieties, if desired. Examples of such compounds useful in providing the cure site moiety are described in U.S. Pat. No. 5,696,216 (Kruger et al.) and U.S. Pat. No. 5,679,851 (Saito et al.). Preferably, the cure site moieties are derived from one or more compounds of the formulae: $CX_2=CX(Z)$, wherein X is H or F (peferably, F), Z is Br, I, or $R_f^2$ wherein U=Br, I, or CN, and $R_f^2$ is a perfluorinated divalent linking group optionally containing O atoms; and $Y(CF2)_qY$, wherein Y is Br or I and q=1–6. Preferably, there are about 0.2–5 mole-% of these cure site moieties present. A preferred group of cure site moieties include those derived from compounds such as $CF_2=CFBr$, $CF_2=CHBr$, $CF_2=CHCF_2CF_2Br$, $ICF_2CF_2CF_2CF_2I$, $BrCF_2CF_2Br$, $—CF_2=CFO(CF_2)_3—OCF_2CF_2Br$, and mixtures thereof. Such compounds may be produced as described in U.S. Pat. No. 4,418,186 (Yamabe et al.), U.S. Pat. No. 5,225,504 (Tatsu et al.), and U.S. Pat. No. 5,214,106 (Carlson et al.). Another preferred group of cure site moieties include those derived from compounds such as $CF_2=CFO(CF_2)_rOCF(CF_3)CN$ wherein r=2–5. Such compounds may be produced as described in U.S. Pat. No. 5,679,851 (Saito et al.), U.S. Pat. No. 5,717,037 (Saito et al.), and U.S. Pat. No. 5,736,614 (Saito et al.), and *Synthesis of Fluoroorganic Compounds Monomers and Intermediate Products*, Academician I. L. Knunyanc and Prof. G. G. Yakobson, Moscow, Izdatelstuo, "Chimia" 1997.

Preferably, the fluorocarbon polymers of the present invention include about 50–80 mole-% of the repeating units derived from vinylidene fluoride, and about 10–50 mole-% of the repeating units derived from the perfluorinated ether, with or without a halogen cure site. They can optionally include up to about 30 mole-% of repeating units derived from a fluoromonoolefin other than the perfluorinated ether and vinylidene fluoride. Such other fluoromonoolefins include, for example, hexafluoropropene, chlorotrifluoroethylene, tetrafluoroethylene, 1-hydropentafluoropropene, perfluoro(methylvinylether) perfluoro(propylvinylether), perflourocyclobutene, and perfluoro(methylcyclopropene). Optionally, the aforementioned one or more fluoromonoolefins may be copolymerized with fluorine-free olefitic monomers such as ethylene and propylene.

The preferred elastomers are copolymers of vinylidene fluoride, a compound of Formula I, and at least one terminally unsaturated fluoromonoolkfin Containing at least one fluorine atom substituent on each double-bonded carbon atom, each carbon atom of said fluoromonoolefin being substituted only with fluorine, chlorine, hydrogen, lower fluoroalkyl radical, or lower fluoroalkoxy radical, particulurly hexafluoropropene, tetrafluoroethylene, chlorotrifluoroethylene, and 1-hydropentafluoropropene. When including other copolymerizable monomers, such as tetrafluoroethylene (TFE), and retention of the superior low temperature properties is desired, the monomers should be included in quantities and unit blocks which do not substantially alter the low temperature properties.

The present invention also provides an elastomeric polymer prepared from a crosslinkable composition comprising the curable fluorocarbon polymer described above. For compounds containing halide cure site moieties, the crosslinkable composition can further include an optional free radical initiator, and an optional co-curing agent. Although such additives are preferred, they are not necessarily required, as crosslinking can also occur through the use of e-beam radiation, for example.

Preferably, the free radical initiator is a peroxide. Such peroxide curatives include organic or inorganic peroxides. Organic peroxides are preferred, particularly those that do not decompose during dynamic mixing temperatures. Suitable peroxides include dicumyl peroxide, 2,5-dimethyl-2,5-di(tbutylperoxy)hexane, di-t-butyl peroxide, t-butylperoxy benzoate, 2,5-dimethyl-2,5-di(t-butylperoxy)hexane-3 and laurel peroxide. Other suitable peroxide curatives are listed in U.S. Pat. No. 5,225,504 (Tatsu et al.). The amount of peroxide curing agent used generally will be 0.1 to 5, preferably 1 to 3 parts per 100 parts of fluoropolymer gum (i.e., fluorocarbon polymer).

In peroxide vulcanization of the fluorocarbon polymer using an organic peroxide, it is often desirable to include a co-curing agent (e.g., a co-agent or co-crosslinking agent). The use of such a co-curing agent is well known to one skilled in the art. Examples of such agents include tri (methyl)allyl isocyanurate, triallyl isocyanurate, tri(methyl) allyl cyanurate, N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, etc. Another useful co-curing agent may be represented by the formula $CH_2=CH—R_f^1—CH=CH_2$ wherein $R_f^1$ is as described above. Such co-curing agents provide enhanced mechanical strength to the final cured elastomer. They generally ae used in amount of 1 to 10, preferably 1 to 5 parts, per 100 parts of the fluorocarbon polymer.

For nitrile cure site moieties, the crosslinkable composition can further include one or more substances known to promote the formation of triazine rings by trimerization of nitriles under the influence of heat. These include organometallic compounds of arsenic, antimony, and tin described in U.S. Pat. No. 3,470,176 (Zollinger et al.) and U.S. Pat. No. 3,546,186 (Gladding et al.), and the metal oxides described in U.S. Pat. No. 3,523,118 Emerson et al.).

Other compounds that can be used to vulcanize fluorocarbon polymers containing nitrite cure site moieties include bis(aminophenols) of the formula

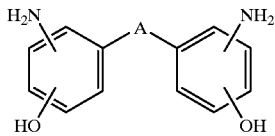

and tetraamines of the formula

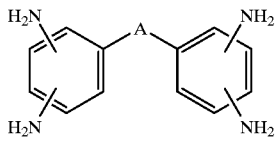

where A is $SO_2$, O, CO, $(C_1-R_6)$ alkyl groups, perfluoro $(C_1-C_{10})$ alkyl groups, or a carbon-carbon bond linking the two aromatic rings. Such compounds are disclosed in U.S. Pat. No. 4,525,539 (Feiring). Other vulcanizers or promoters that can be used in compositions containing fluorocarbons polymers having nitrite cure sites are disclosed in U.S. Pat. No. 4,005,142 (Evers) and U.S. Pat. No. 4,434,106 (Rosser at al.).

A further optional component (a preferred component for compounds containing halide cure cite moities) in the crosslinkable composition is an acid acceptor. Acid acceptors can be inorganic or organic compounds. Organic acid acceptors include sodium stearate and magnesium oxalate. However, acid acceptors are generally inorganic bases and include magnesium oxide, lead oxide, calcium oxide, calcium hydroxide, dibasic lead phosphite, zinc oxide, barium carbonate, strontium hydroxide, calcium carbonate, etc. The preferred acid acceptors are zinc oxide and calcium hydroxide. The acid acceptors can be used singly or in combination, and are used in amounts ranging from about 1 to about 25 parts per 100 parts by weight of the polymer.

The crosslinkable composition can also include fillers and colorants. PFllers can be mixed with the fluorocarbon polymer to improve molding characteristics and other properties. When a filler is employed, it can be added to the vulcanization recipe in amounts of up to about 100 parts per hundred parts by weight of fluorocarbon polymer, preferably between about 15 to 50 parts per hundred parts by weight of the fluorocarbon polymer. Examples of fillers which may be used include, but are not limited to, reinforcing thermal grade carbon blacks or non-black pigments of relatively low reinforcement characteristics such as clays and barytes.

The crosslinkable fluorocarbon polymer composition can be compounded or mixed in one or several steps, using any of the usual rubber mixing devices such as internal mixers (e.g., Banbury mixers), roll mills, etc. For best results, the temperature of the mixture should not rise above about 120° C. During mixing it is necessary to distribute the components and additives uniformly throughout for effective cure.

The mixture is then processed and shaped, for example, by extrusion (for example in the shape of a hose or hose lining) or molding (for example, in the form of an O-ring seal). The shaped article can then be heated to cure the gum composition and form a cured elastomer article.

Pressing of the compounded mixture (i.e., press cure) is typically conducted at a temperature of about 95–230° C., preferably about 150–205° C., for a period of about 1 minute to about 15 hours, usually for about 1–10 minutes. A pressure of about 700–20,000 kPa, preferably about 3400–6800 kPa, is typically used in molding the composition. The molds first may be coated with a release agent and prebaked.

The molded vulcanizate is then usually post cured in an oven at a temperature of about 150–315° C., preferably at a temperature of about 200–260° C., for a period of about 2–50 hours or more, depending on the cross-sectional thickness of the sample. For thick sections, the temperature during the post cure is usually raised gradually from the lower limit of the range to the desired maximum temperature. The maximum temperature used is preferably about 260° C., and is held at this value for about 4 hours or more.

The invention will be further described by reference to the following detailed examples. These examples are offered to further illustrate the various specific and illustrative embodiments and techniques. It should be understood, however, that many variations and modifications may be made while remaining within the scope of the present invention.

EXAMPLES

The following examples describe the preparation and evaluation of elastomeric copolymer materials containing perfluoroether units and cured compositions of the invention. The indicated results were obtained using the following test methods:

Test Methods

Mooney viscosity was determined by ASTM 1646-94 (ML 1+10@ 121° C.). Results are reported in Mooney units.

Cure Rheology Tests were run on uncured, compounded admixtures using a Monsanto Moving Die Rheometer (MDR) Model 2000 in accordance with ASTM D 5289-95 at 177° C., no preheat, 12 minute elapsed time (unless otherwise specified) and a 0.5° C. arc. Minimum torque ($M_L$), Maximum torque ($M_H$), i.e., highest torque attained during specified period of time when no plateau or maximum was obtained and Difference in Torque, $\Delta T$, i.e., ($M_H$–$M_L$), were reported. Also reported were: $t_s2$ (time for torque to increase 2 units above $M_L$), t'50 (time for torque to reach $M_L$+0.5[$M_H$–$M_L$]), and t'90 (time for torque to reach $M_L$+0.9[$M_H$–$M_L$]).

Press-cured samples (150×75×2.0 mm sheets, unless otherwise noted) were prepared for physical property determination by pressing at about 6.9×10³ kPa for the indicated amount of time and temperature.

Post cure samples were prepared by placing a press-cured sample in a circulating air oven. The oven was maintained at 232° C. and the samples treated for 16 hours.

Tensile Strength at Break, Elongation at Break, and Modulus at 100% Elongation were determined using ASTM D 412-75 on samples cut from 2.0 mm sheet with ASTM Die D. Units are reported in Mega Pascals (MPa).

Hardness was determined using ASTM D 2240-85 Method A with a Type A-2 Shore Durometer. Units are reported in points.

Retraction at Lower Temperatures (TR-10) was determined using ASTM D 1329-88 (reapproved 1993) with ethanol as the cooling media. Units are reported in ° C.

Compression set determined by ASTM D 395-89 Method B with 0.139 inch (3.5 mm) O-rings compressed for 70 hours at 200° C. Results are reported as %.

Glass Transition Temperature

Glass Transition Temperature was determined by ASTM E1356-91 (Reapproved 1995), or by Russian Standard Method 12254-66, which is briefly described below. This was measured using a static load. A rubber cylinder was cooled at a rate of 1-degrees/minute to the temperature 10–20 degrees below the expected glass transition temperature. The temperature was maintained until the sample froze which typically took about 10 minutes. A load of 5 kg was then applied and the samples were heated at a rate of 1 degree/minute. The temperature and strain was registered every minute. The temperature where a regular increase in deformation started was taken as the glass transition temperature. An average of 5–10 measurements were taken.

Copolymer 1

Copolymer 1 was made in a 1 liter stainless steel reactor equipped with magnetic-driven stirrer (3000 rpm), two precision valves for feeding in the reaction components, siphon for sampling, thermocouple, vacuum gage and a thermostaticly controlled jacket. The reactor was evacuated and charged with 225 grams of deionized water. The following ingredients were then added from a glass ampule: 92 grams of $CF_2=CFOCF_2CF_2(OCF_2)_4OCF_3$ (ether); 2.0 grams of $CF_2=CFOCF_2CF_2CF_2OCF_2CF_2Br$ (halogen cure site); and 0.45 gram of initiator $[CF_3CF_2CF_2OCF(CF_3)COO]_2$ in 6.9 grams of Freon 113 solution were charged into the reactor. Then, while stirring, 23.8 grams of TFE monomer and 30.1 grams of VF2 monomer were fed from a metallic cylinder. A molar ratio of the charged monomers was 53.6/26.7/19.2/0.5, respectively, of VF2/TFE/ether/halogen cure site.

The reactor was heated to 24° C. and the pressure in the reactor rose to 16 atm. The polymerization was carried out at 21–22° C. The pressure decreased as polymerization proceeded, and the process was stopped when the pressure reached a constant 1.3 atm. The reactor was cooled to room temperature, the stirring was stopped, and the gaseous substances were purged. The reactor was opened and the copolymer which had all coagulated in the course of polymerization was separated. The copolymer was washed thoroughly with hot water, then washed once with ethanol and dried at 60° C. A yield of 130 grams of copolymer was obtained. The properties of Copolymer 1 are given in Table 2.

Copolymer 2

Copolymer 2 was made in a 1 liter stainless steel reactor equipped with magnetic-driven stirrer (3000 rpm), two precision valves for feeding in the reaction components, siphon for sampling, thermocouple, vacuum gage, and a jacket connected to a thermostat. The reactor was evacuated and charged with 230 grams of deionized water. The following ingredients were then charged into the reactor from a glass ampule: 93.6 grams of $CF_2=CFOCF_2CF_2(OCF_2)_4OCF_3$ (ether), 1.98 grams of $CF_2=CFOCF_2CF_2CF_2OCF_2CF_2Br$ (halogen cure site), and 0.45 gram of initiator $[CF_3CF_2CF_2OCF(CF_3)COO]_2$ in 6.9 grams of Freon 113 solution were. Then, while stirring, 24.0 grams of TFE monomer and 30.7 grams of VF2 monomer were fed from a metallic cylinder. A molar ratio of the charged monomers was 53.6/26.7/19.2/0.5 respectively of VF2/TFE/ether/halogen cure site.

The reactor was heated to 24° C. and the pressure in the reactor rose to 17 atm. The polymerization was carried out at 21–24° C. The pressure decreased as polymerization proceeded, and the process was stopped when the pressure reached a constant 2.6 atm. The reactor was cooled to room temperature, the stirring was stopped, and the gaseous substances were purged. The reactor was opened and the copolymer which had all coagulated in the course of polymerization was separated. The copolymer was washed thoroughly with hot water, then washed once with ethanol and dried at 60° C. under vacuum. A yield of 110 grams of copolymer was obtained. The properties of Copolymer 2 are in Table 2.

Copolymer 3

Copolymer 3 was made in a 40 liter stainless steel reactor equipped with a safety valve for 40 $kg/cm^2$ pressure, jacket for temperature control, stirrer rotating at 180 to 220 rpm, a siphon for charging monomers, thermocouple, vacuum gage and a bottom discharge valve. The reactor was evacuated and charged with 22.1 kg of deionized water, 1.4 kg of Freon 113, and 8.0 grams of $[CF_3CF_2CF_2OCF(CF_3)COO]_2$ in 39 grams of Freon 113. Then, while stirring, a mixture of 3.25 kg of $VF_2$, 1.55 kg of TFE, 7.27 kg of $CF_2=CFOCF_2CF_2(OCF_2)_3OCF_3$, and 0.065 kg of $CF_2=CFBr$ was added from a stainless steel cylinder over one hour while maintaining the temperature at 30° C. and the pressure at 17.5 atm. The molar ratio of charged monomer was 61.7/19.1/18.7/0.5, respectively, of $VF_2$/TFE/etherlhalogen cure site. The reaction was allowed to proceed at temperature until the pressure dropped to 1 atm. Total reaction time was 19 hours.

The reactor was cooled to room temperature and the gaseous substances were purged. The reactor was opened and the copolymer, whch had all coagulated in the course of the polymerization was separated. The copolymer was washed thoroughly with hot water (70° C.) and then dried under vacuum at 60° C. A yield of 7.7 kg of copolymer was obtained. The properties of Copolymer 3 are given in Table 2.

Copolymer 4

Copolymer 4 was made in a 40 liter stainless steel reactor equipped with a safety valve for 40 $kg/cm^2$ pressure, jacket for temperature control, stirrer rotating at 180 to 220 rpm, a siphon for charging monomers, thermocouple, vacuum gage and a bottom discharge valve. The reactor was evacuated and charged with 22.1 kg of deionized water, 1.4 kg of Freon 113, and 8.0 grams of $[CF_3CF_2CF_2OCF(CF_3)COO]_2$ in 39 grams of Freon 113. Then, while stirring, a mixture of 3.25 kg of $VF_2$, 1.55 kg of TFE, 7.27 kg of $CF_2=CFOCF_2CF_2(OCF_2)_3OCF_3$, and 0.065 kg of $CF_2=CFBr$ was added from a stainless steel cylinder over one hour while maintaining the temperature at 35° C. and the pressure at 17.5 atm. The molar ratio of charged monomer was 61.7/19.1/18.7/0.5, respectively, of $VF_2$/TFE/ether/halogen cure site. The reaction was allowed to proceed at temperature until the pressure dropped to 1 atm. Total reaction time was 16 hours.

The reactor was cooled to room temperature and the gaseous substances were purged. The reactor was opened and the copolymer, which had all coagulated in the course of the polymerization was separated. The copolymer was washed thoroughly with hot water (70° C.) and then dried under vacuum at 60° C. A yield of 9.7 kg of copolymer was obtained. The properties of Copolymer 4 are given in Table 2.

TABLE 2

| Polymer | 1 | 2 | 3 | 4 |
|---|---|---|---|---|
| $Tg^{(a)}$, ° C. | −92 | −90 | −83 | −81 |
| $Tg^{(b)}$, ° C. | −80 | −8o | −78 | −72 |
| O/C Ratio | 0.33 | 0.31 | 0.28 | 0.28 |
| Mooney Viscosity | 35 | 29 | 37 | 48 |
| Composition, Mole % | | | | |
| $VF_2$ | 53.6 | 55.5 | 58.8 | 61.8 |
| TFE | 28.0 | 28.0 | 23.7 | 20.9 |
| Ether | 18.0 | 16.0 | 17.0 | 16.7 |
| CSM | 0.4 | 0.5 | 0.5 | 0.6 |

$^{(a)}$By Russian Standard Method 12254-66
$^{(b)}$By ASTM B1356-91 at a Scan Rate of 20° C./min

EXAMPLES 1–4

In the follow examples, the compositions are based on 100 parts of copolymer. The curatives and other additives are fisted as parts per hundred parts of the rubber or copolymer (phr). The formulations and test results are summarized in Table 3.

TABLE 3

| Compound Evaluation | | | | |
|---|---|---|---|---|
| Polymer | | | | |
| #1 | 100 | | | |
| #2 | | 100 | | |
| #3 | | | 100 | |
| #4 | | | | 100 |
| ARO-60[1] | 30 | 30 | | |
| N990[2] | | | 30 | 30 |
| $Ca(OH)_2$[3] | 3 | 3 | 3 | 3 |
| TAIC[4] | 3 | 2 | 1.5 | 1.5 |
| Luperco 101XL[5] | 3 | 2 | 1.5 | 1.5 |
| Monsanto MDR at 177° C. 0.5° Arc, 100 cpm. 12 Minutes | | | | |
| ML, dNm | 2.1 | 2.3 | 2.0 | 1.7 |
| MH, dNm | 10.9 | 9.6 | 9.9 | 9.0 |
| ΔT, dNm | 8.8 | 7.3 | 7.9 | 7.3 |
| $T_s2$, min | 0.8 | 1.1 | 0.6 | 0.7 |
| t'50, min | 1.1 | 1.4 | 0.8 | 0.9 |
| t'90, min | 3.6 | 4.4 | 2.0 | 2.5 |
| Properties, 2mm Thick Sheet Die D Dumbbells | | | | |
| Press Cure Time, min @ 177° C. | 10 min | 10 min | 10 min | 10 min |
| Post Cured 16 hrs @ Temp. | 230°C. | 200°C. | 230°C. | 230°C. |
| Tensile, Mpa | 6.3 | 6.7 | 5.5 | 6.7 |
| 100% Mod, Mpa | 2.4 | 1.2 | 3.4 | 4.0 |

TABLE 3-continued

Compound Evaluation

| Elongation, % | 205 | 475 | 135 | 130 |
|---|---|---|---|---|
| Hardness, Shore A$_2$ | 58 | 61 | 60 | 57 |

Compression Set, Method B, O-Rings

| 70 hr @ 200° C. | 38 | 50 | 20.5 | 16.7 |
|---|---|---|---|---|

MEOH Volume Swell, One (1) Week at Room Temp

| % | 4.6 | 4.6 | 8 | 7 |
|---|---|---|---|---|

Temperature of Retraction, ASTM D-1329 (50% of Break Elongation) (In ETOH)

| TR-2, ° C. | −75.5 | −75.6 | −71 | −69 |
|---|---|---|---|---|
| TR-10, ° C. | −69.9 | −68.6 | −57 | −61 |
| TR-30, ° C. | −43.8 | −41.7 | −39 | −43 |
| TR-50, ° C. | −22.9 | −21.0 | −22 | −24 |
| TR-50, ° C. | −4.8 | −9.0 | −3 | −6 |
| Tensile Set, % | 4 | — | 2.0 | 1.0 |

[1] Carbon black obtained from J.M. Huber Corp., Borger, TX
[2] Carbon black obtained from J.M. Huber Corp., Borger, TX
[3] Obtained from C.P. Hally Bedford Park, IL
[4] Trialkyisocyanurate obtained from Mitsubishi Industry, Tokyo, JP
[5] Peroxide obtained from Lucidol Division of Pennwalt Corp., Buffalo, NY Copolymer 5

Copolymer 5 was made in a 40 liter stainless steel reactor equipped with a safety valve for 40 kg/cm$^2$ pressure, jacket for temperature control, stirrer rotating at 180 to 220 rpm, a siphon for charging monomers, thermocouple, vacuum gage and a bottom discharge valve. The reactor was evacuated and charged with 13 kg of deionized water and an aqueous solution of 60/40 weight ratio of ammonium perfluoroheptanoate and ammonium perfluorooctanoate containing 190 grams of total surfactants. An agueous solution of 13 grams of ammonium persulfate was then added. Then, while stirring, a mixture of 2.1 kg of VF$_2$, 4.27 kg of CF$_2$=CFOCF$_2$CF$_2$(OCF$_2$)$_2$OCF$_3$ and 0.17 kg of CF$_2$=CFO(CF$_2$)$_3$OCF(CF$_3$)CN was added from a stainless steel cylinder. The molar ratio of the charged monomers was 75.3/23.7/1.0, respectively, of VF$_2$/ether/nitrile cure site. The temperature was then increased to 60° C. resulting in a pressure of 28.7 atm. The reaction proceeded until the pressure dropped to 1 atm. Total reaction time was 12 hours.

The reactor was cooled to room temperature and the gaseous substances were purged. The latex was removed through the bottom discharge valve, coagulated with MgCl$_2$ solution; washed with hot water (70° C.) and dried under vacuum at 60° C. A yield of 4.0 kg of polymer was obtained. The properties of Copolymer 5 are given in Table 4.

Copolymer 6

Copolymer 6 was made in a 40 liter stainless steel reactor equipped with a safety valve for 40 kg/cm$^2$ pressure, jacket for temperature control, stirrer rotating at 180 to 220 rpm, a siphon for charging monomers, thermocouple, vacuum gage and a bottom discharge valve. The reactor was evacuated and charged with 13 kg of deionized water and an aqueous solution of 60/40 weight ratio of ammonium perfluoroheptanoate and ammonium perfluorooctanoate containing 190 gms of total surfactants. An aqueous solution of 13 grams of ammonium persulfate was then added. Then, while stirring, a mixture of 2.0 kg of VF$_2$, 4.1 kg of CF$_2$=CFOCF$_2$CF$_2$(OCF$_2$)$_2$OCF$_3$ and 0.24 kg of CF$_2$=CFO(CF$_2$)$_3$OCF(CF$_3$)CN was added from a stainless steel cylinder. The molar ratio of the charged monomers was 74.8/23.7/1.5, respectively, of VF$_2$/ether/nitrile cure site. The temperature was then increased to 60° C. resulting in a pressure of 23.6 atm. The reaction proceeded until the pressure dropped to 1 atm. Total reaction time was 19 hours.

The reactor was cooled to room temperature and the gaseous substances were purged. The latex was removed through the bottom discharge valve, coagulated with MgCl$_2$ solution; washed with hot water (70° C.) and dried under vacuum at 60° C. A yield of 3.9 kg of polymer was obtained. The properties of copolymer 6 are given in Table 4.

Copolymer 7

Copolymer 7 was made in a 40 liter stainless steel reactor equipped with a safety valve for 40 kg/sq cm pressure, jacket for temperature control, stirrer rotating at 180 to 220 rpm, a siphon for charging monomers, thermocouple, vacuum gage and a bottom discharge valve. The reactor was evacuated and charged with 21 kg of deionized water and an aqueous solution of 60/40 weight ratio of ammonium perfluoroheptanoate and ammonium perfluorooctanoate containing 315 grams of total surfactant. An aqueous solution of 21 grams of amuonium persulfate was than added. Then, while stirring and the temperature at 65° C., a mixture of 2.6 kg of VF$_2$, 1.1 kg of TFE, 6.5 kg of CF$_2$=CFOCF$_2$CF$_2$(OCF$_2$)$_2$OCF$_3$, and 0.39 kg of CF$_2$=CFO(CF$_2$)$_3$OCF(CF$_3$)CN was added from a stainless steel cylinder continuously. The molar ratio of the charged monomers were 59.4/16.1/23.0/1.5, respectively, VF2/TFE/Ether/nitrile cure site. The pressure was held at 4 atms during the polymerization by controlling the rate of addition of the monomers. The reaction was stopped after all the monomer was added and the pressure had dropped to 1 atm. Total reaction time was 57 hours.

The reactor was cooled to room temperature and the gaseous substances were purged. The latex was removed through the bottom discharge valve, coagulated with MgCl$_2$ solution; washed with hot water (70° C.) and dried under vacuum at 60° C. A yield of 6.0 kg of polymer was obtained. The properties of Copolymer 7 are given in Table 4.

TABLE 4

| Polymer | 5 | 6 | 7 |
|---|---|---|---|
| Tg[a], ° C. | −73 | −76 | −79 |
| Tg[b], ° C. | −66 | −66 | −66 |
| O/C Ratio | 0.29 | 0.29 | 0.31 |
| Mooney Viscosity | 11 | 4 | 2 |
| Composition, Mole % | | | |
| VF$_2$ | 76.2 | 76.2 | 60.0 |
| TFE | — | — | 14.2 |
| Ether | 22.7 | 22.5 | 24.0 |
| CSM | 1.1 | 1.3 | 1.8 |

[a] By Russian Standard Method 12254-66
[b] By ASTM E1356-91 at a Scan Rate of 20° C./min

EXAMPLES 5–7

In the following examples, the compositions are based on 100 parts of copolymer. The curative and other additives are listed as parts per hundred parts of the rubber or copolymer (phr). The formulations and test results are summarized in Table 5.

TABLE 5

Compound Evaluation

| Polymer | | | |
|---|---|---|---|
| #5 | 100 | | |
| #6 | | 100 | |
| #7 | | | 100 |

TABLE 5-continued

| Compound Evaluation | | | |
|---|---|---|---|
| N-990[1] | 40 | 40 | 40 |
| BOAP[2] | 2 | 2 | 2 |
| FC-143[3] | 1 | | 1 |
| MDR @ X° C., 0.50 ARC, X MIN | | | |
| Minutes | 30 | 30 | 30 |
| Temperature | 177 | 177 | 177 |
| ML, dNm | 0.4 | 0.2 | 0.0 |
| MH, dNm | 7.3 | 2.7 | 4.6 |
| ΔT, dNm | 6.9 | 2.5 | 4.6 |
| $t_s2$, min | 6.3 | 28.7 | 9.1 |
| t'50, min | 9.5 | 23.0 | 9.2 |
| t'90, min | 18.3 | 28.7 | 19.0 |
| Physical Properties | | | |
| Press Cure X min @ 177° C. | | | |
| Minutes | 30 | 60 | 30 |
| Tensile, Mpa | 4.6 | 5.2 | 3.2 |
| 100%, Mod, Mpa | 2.0 | 1.3 | 1.2 |
| Elongation,% | 215 | 390 | 220 |
| Hardness, Shore A$_2$ | 55 | — | 48 |
| Post Cure 16°hrs @ 230° C. | | | |
| Tensile, Mpa | 5.2 | 5.0 | 3.9 |
| 100% Mod, Mpa | 4.2 | 4.3 | 3.6 |
| Elongaton, % | 110 | 110 | 105 |
| Hardness, Shore A$_2$ | 55 | 55 | 53 |
| Compression Set, Method B, O-Rings | | | |
| 70 hr @ 200° C., % | 15.8 | 12.7 | 21.7 |
| Low Temperature of Retraction in Ethanol | | | |
| TR-2, ° C. | −62 | −61 | −61 |
| TR-10, ° C. | −58 | −56 | −56 |
| TR-30, ° C. | −52 | −50 | −39 |
| TR-50, ° C. | −45 | −45 | −42 |
| TR-70, ° C. | −21 | −21 | −32 |

[1]Carbon black obtained from J. M Huber Corp. Borger, TX.
[2]2,2-Bis(3-amino-4-hydroxyphenyl)hexaflouropropane, obtained from Central Glass Co., Saitama, Japan.
[3]Fluorad ® Surfactant, FC-143, obtained from 3M, St. Paul, MN.

The results in Tables 3 and 5 show that useful, cured samples may be made using the compositions of the invention.

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A fluorocarbon polymer comprising:
   a) repeating units derived from one or more perfluorinated ethers of the formula:

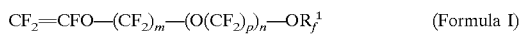

$CF_2=CFO-(CF_2)_m-(O(CF_2)_p)_n-OR_f^1$  (Formula I)

wherein $R_f^1$ is a perfluorinated ($C_1-C_4$)alkyl group, m=1–4, n=0–6, and p=1–2; and
   b) repeating units derived from vinylidene fluoride; wherein the polymer has a glass transition temperature of −50° C. or lower and an oxygen to carbon ratio of at least about 0.2.

2. The fluorocarbon polymer of claim 1 comprising about 10–50 mole-% of the repeating units derived from the perfluorinated ether.

3. The fluorocarbon polymer of claim 2 comprising about 50–80 mole-% of the repeating units derived from vinylidene fluoride.

4. The fluorocarbon polymer of claim 2 further comprising no greater than about 30 mole-% of repeating units derived from a fluorombnoolefin other than vinylidene fluoride and the compounds of Formula (I).

5. The fluorocarbon polymer of claim 1 further comprising an effective amount of cure site moieties derived from one or more compounds of the formulae:
   a) $CX_2=CX(Z)$, wherein:
      (i) X is H or F; and
      (ii) Z is Br, I, or $R_f^2U$ wherein U=Br, I, or CN and $R_f^2$=a perfluorinated divalent linking group optionally containing O atoms; and
   (b) $Y(CF_2)_qY$, wherein:
      (i) Y is Br or I; and
      (ii) q=1–6.

6. The fluorocarbon polymer of claim 1 having a Tg otless than about −50° C.

7. A fluorocarbon polymer comprising:
   a) repeating units derived from one or more perfluorinated ethers of the formula:

$CF_2=CFO-(CF_2)_m-(O(CF_2)_p)_n-OR_f^1$ wherein $R_f^1$ is a perfluorinated ($C_1-C_4$)alkyl group, m=1–4, n=0–6, and p=1–2; and
   b) repeating units derived from vinylidene fluoride;
   (c) 0.2–5 mole-% of cure site moieties derived from one or more compounds of the formulae:
      (i) $CX_2=CX(Z)$, wherein:
         (A) X is H or F; and
         (B) Z is Br, I, or $R_f^2U$ wherein U=Br, I, or CN and $R_f^2$=a perfluorinated divalent linking group optionally containing O atoms; and
      (ii) $Y(CF_2)_qY$, wherein:
         (A) Y is Br or I; and
         (B) q=1–6;
   wherein the polymer has a glass transition temperature of −50° C. or lower and an oxygen to carbon ratio of at least about 0.2.

8. The fluorocarbon polymer of claim 7 comprising about 50–80 mole-% of the repeating units derived from vinylidene fluoride.

9. The fluorocarbon polymer of claim 7 comprising about 10–50 mole-% of the repeating units derived from the perfluorinated ether.

10. The fluorocarbon polymer of claim 7 further comprising no greater than about 30 mole-% of repeating units derived from a fluoromonoolefin other than vinylidene fluoride and the compounds of Formula (I).

11. The fluorocarbon polymer of claim 10 wherein the fluoromonoolefin is tetrafluoroethylene.

12. The fluorocarbon polymer of claim 7 wherein m=2–4.

13. The fluorocarbon polymer of claim 7 wherein m=1–2.

14. The fluorocarbon polymer of claim 7 wherein n=1–6 and p=1.

15. The fluorocarbon polymer of claim 14 wherein n=2–4.

16. The fluorocarbon polymer of claim 7 wherein the cure site moieties are derived from one or more compounds selected from the group consisting of $CF_2=CFBr$, $ICF_2CF_2CF_2CF_2I$, $BrCF_2CF_2Br$, $CF_2=CFO(CF_2)_3-OCF_2CF_2Br$, $CH_2=CHCF_2CF_2Br$, and mixtures thereof.

17. The fluorocarbon polymer of claim 7 wherein the cure site moieties are derived from one or more compounds of the formula $CF_2=CFO(CF_2)_rOCF(CF_3)CN$ wherein r=2–5.

18. An elastomeric polymer prepared from a crosslinkable composition comprising a fluorocarbon polymer comprising:
   a) repeating units derived from one or more perfluorinated ethers of the formula (Formula I):

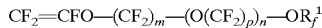

wherein $R_f^1$ is a perfluorinated ($C_1$–$C_4$)alkyl group, m=1–4, n=0–6, and p 1–2; and
   (b) repeating units derived from vinylidene fluoride;
   (c) 0.2–5 mole-% of cure siten moieties derived from one or more compounds of the formulae:
      (i) $CX_2=CX(Z)$, wherein:
         (A) X is H or F; and
         (B) Z is Br, I, or $R_f^2U$ wherein U=Br, I, or CN and $R_f^2$=a perfluorinated divalent linking group optionally containing O atoms; and
      (ii) $Y(CF_2)_qY$, wherein:
         (A) Y is Br or I; and
         (B) q=1–6;
   wherein the polymer has a glass transition temperature of −50° C. or lower and an oxygen to carbon ratio of at least about 0.2.

19. The elastomeric polymer of claim 18 wherein the crosslinkable composition further comprises a free radical initiator.

20. The elastomeric polymer of claim 19 wherein the crosslinkable composition further comprises a co-curing agent.

21. The elastomeric polymer of claim 20 wherein the co-curing agent comprises a triallyl isocyanurate.

22. The elastomeric polymer of claim 19 wherein the free radical initiator comprises a peroxide initiator.

23. The elastomeric polymer of claim 18 further comprising one or more fillers.

24. An article comprising the elastomeric polymer of claim 18 which is a seal.

25. An article comprising the elastomeric polymer of claim 18 which is a hose.

26. An article comprising the elastomeric polymer of claim 18 which is a diaphragm.

27. A coating on a substrate, wherein the coating comprises the elastomeric polymer of claim 18.

28. A method of preparing an elastomeric polymer comprising:
   (a) providing a crosslinkable composition comprising a fluorocarbon polymer comprising:
      i) repeating units derived from one or more perfluorinated ethers of the formula:

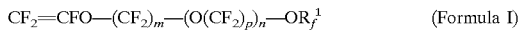 (Formula I)

wherein $R_f^1$ is a perfluorinated ($C_1$–$C_4$)alkyl group, m=1–4, n=0–6, and p=1–2; and
      ii) repeating units derived from vinylidene fluoride;
      iii) 0.2–5 mole-% of cure site moieties derived from one or more compounds of the formulae:
         $CX_2=CX(Z)$, wherein:
            X is H or F; and
            Z is Br, I, or $R_f^2U$ wherein U=Br, I, or CN and $R_f^2$= a perfluorinated divalent linking group optionally containing O atoms; and
         $Y(CF_2)_qY$, wherein:
            Y is Br or I; and
            q=1–6;
   wherein the polymer has a glass transition temperature of −50° C. or lower and an oxygen to carbon ratio of at least about 0.2; and
   (b) subjecting the crosslinkable composition to conditions effective to at least partially cure.

29. The method of claim 28 wherein the step of subjecting the crosslinkable composition to conditions effective to at least partially cure comprises applying heat and pressure.

30. The method of claim 29 wherein the step of subjecting the crosslinkable composition to conditions effective to at least partially cure comprises subjecting the composition to radiation.

* * * * *

UNITED STATES PATENT AND TRADEMARK OFFICE
CERTIFICATE OF CORRECTION

PATENT NO. : 6,294,627 B1
DATED : September 25, 2001
INVENTOR(S) : Allan T. Worm, Nikolai Vladimirovich Veretennikov, Margarita Alekseevna Volkova and Sergey Vasilievich Sokolov It is certified that error appears in the above-identified patent and that said Letters Patent is hereby corrected as shown below:

Column 1,
Line 38, delete "(allyl" and insert in place thereof -- (alkyl --
Line 41, delete "LTE" and insert in place thereof -- TFE --
Line 67, delete the word "a,"

Column 2,
Line 12, delete "chlorofluorohydrocawbon" and insert in place thereof
-- chlorofluorohydrocarbon --

Column 3,
Line 33, delete "perfluoenaten" and insert in place thereof -- perfluorinated --

Column 5,
Line 3, delete "or $R_f^2$" and insert in place thereof -- or $R_f^2U$ --

Line 5, delete "Y(CF2)qY" and insert in place thereof -- $Y(CF_2)_qY$ --
Line 41, delete "fluoromonoolkfin Containing" and insert in place thereof
-- fluoromonoolefin containing --
Line 67, delete "di(tbutylperoxy)hexane" and insert in place thereof -- di(t-butylperoxy) hexane --

Column 6,
Line 19, delete "ae" and insert in place thereof -- are --
Line 31, delete "nitrite" and insert in place thereof -- nitrile --
Line 55, delete "nitrite" and insert in place thereof -- nitrile --

Column 7,
Line 5, delete "PFllers" and insert in place thereof -- Fillers --

Column 8,
Line 30, delete "1-degrees/minute" and insert in place thereof -- 1-5 degrees/minute --

Column 9,
Line 45, delete "VF$_2$/TFE/etherlhalogen" and insert in place thereof -- VF$_2$/TFE/ether/ halogen --

Column 10,
Line 29, delete "ASTM B1356-91" and insert in place thereof -- ASTM E1356-91 --
Line 35, delete "fisted" and insert in place thereof -- listed --

UNITED STATES PATENT AND TRADEMARK OFFICE
CERTIFICATE OF CORRECTION

PATENT NO. : 6,294,627 B1
DATED : September 25, 2001
INVENTOR(S) : Allan T. Worm, Nikolai Vladimirovich Veretennikov, Margarita Alekseevna Volkova and Sergey Vasilievich Sokolov It is certified that error appears in the above-identified patent and that said Letters Patent is hereby corrected as shown below:

Column 13,
Line 8, delete "0.50" and insert in place thereof -- 0.5° --

Column 14,
Line 6, delete "fluorombnoolefin" and insert in place thereof -- fluoromonoolefin --
Line 19, delete "otless" and insert in place thereof -- of less --

Column 15,
Line 11, delete "p 1-2" and insert in place thereof -- p=1-2 --
Line 13, delete "siten" and insert in place thereof -- site --

Signed and Sealed this

Seventh Day of May, 2002

Attest:

JAMES E. ROGAN
Attesting Officer    Director of the United States Patent and Trademark Office